Aug. 15, 1944.   C. E. BOUTWELL   2,355,949
METHOD OF MAKING COMPOSITE PRINTING PLATES
Filed Aug. 29, 1941
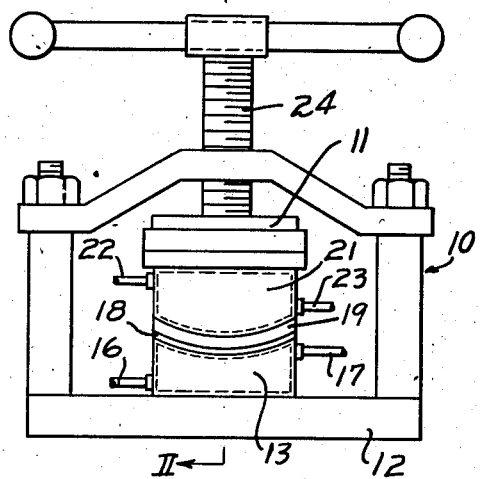
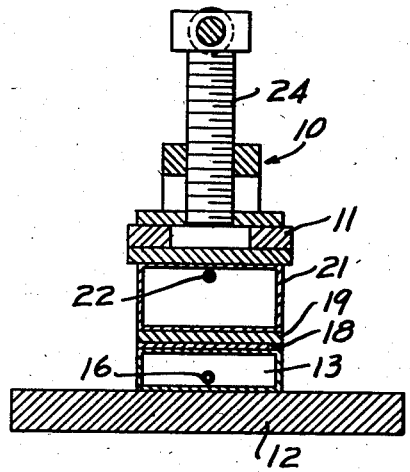
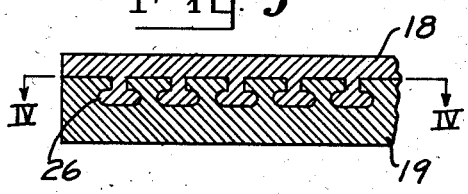
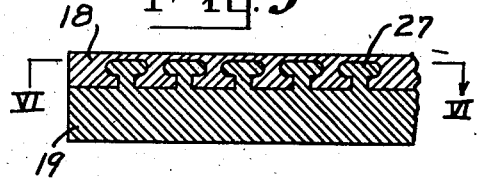
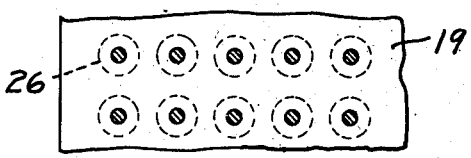
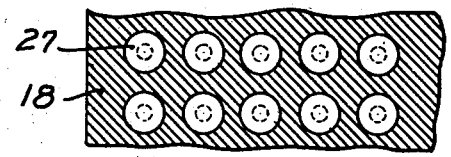
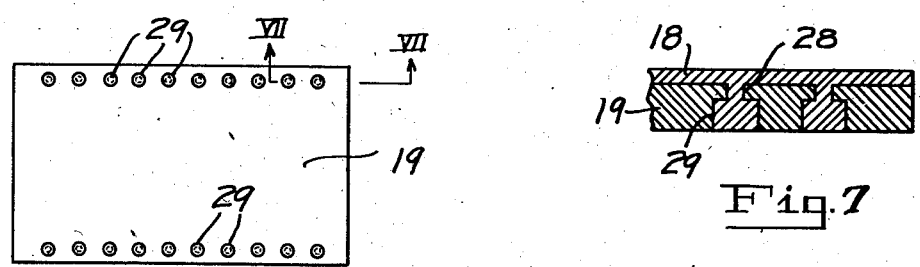
INVENTOR
CLARENCE E. BOUTWELL
BY
ATTORNEY Patented Aug. 15, 1944

2,355,949

UNITED STATES PATENT OFFICE 2,355,949

METHOD OF MAKING COMPOSITE PRINTING PLATES

Clarence E. Boutwell, Birmingham, Ala.

Application August 29, 1941, Serial No. 408,828

3 Claims. (Cl. 154—2)

This invention relates to printing plates, more particularly to a composite printing plate embodying a facing made of plastic composition and bearing the printing surface, and a metallic backing, and has for one of its objects the provision of improved means for securing the facing to the metallic backing.

A further object of my invention is to provide an improved method of making a composite printing plate embodying a thermoplastic facing and a metal backing, in which the printing surface is molded on the facing before it is joined to the backing and the two are joined without distorting the printing surface.

In the broader aspect of my invention, it relates to a method of securing a thermo-plastic composition, or sheet, to a metal surface, and contemplates the treatment of the metal surface whereby to provide a multiplicity of undercut recesses therein and cause the plastic composition, under heat and pressure, to be united thereto without distorting the plastic surface remote from the backing.

A more particular object of my invention is to provide a composite printing plate embodying a plastic facing carrying a printing surface and a curved metal backing adapted to be attached to a rotary printing press, and in which the plastic facing shall be extremely resistant to the stresses imposed by the printing operation tending to separate the facing from the backing.

A still more specific object of my invention is to provide a printing plate embodying a plastic facing and a metal backing in which the plastic facing shall be firmly joined to the metal backing, but may be readily removed and the backing reused.

It has heretofore been proposed to provide plastic printing plates having metal backings, particularly for use on rotary printing presses for the reason that it is difficult to secure a wholly plastic printing plate to such a press. The usual method proposed for securing the plate to the backing has been by some sort of cement. I have found that while cement will successfully hold a rubber printing plate to a metal backing, I have been unable to find a cement which will so hold a rigid plastic plate to the backing. In the case of rubber plates, the resiliency of the plate provides a cushioning effect which protects the cement, but with a rigid plastic printing plate, "live" cement permits the plate to shift on the backing, while a cement which crystallizes breaks loose under the severe pounding to which the plate is subjected on the press.

In accordance with my invention, I prepare a metal backing of the required curvature for attachment to the cylinder of a rotary printing press, and then prepare the curved surface in the same manner that a photo engraver prepares a surface for etching; that is, the curved metal surface is provided with a sensitized film and is subjected to light through a photo engraver's screen, preferably a relatively coarse screen such as 40 line, and is etched with acid so as to form a pattern of strong undercut shoulders. The reverse undercut dot design of pattern is preferably employed as affording better adhesion, though a half tone design may be used. The plastic printing plate is then prepared in the usual manner, for example, as set forth in my prior Patent No. 2,219,587, and is machined to the proper thickness. The metal backing is placed in a suitable press and heated to a temperature above the softening point of the plastic composition forming the printing plate. The printing plate is then placed over the backing and pressed against it. At the same time, the outer surface of the printing plate is kept cool to prevent distortion of the printing surface by heat. Under pressure, the plastic composition enters the undercut recesses of the backing and is firmly joined thereto.

I have found that the method just described of joining the printing plate to the backing does not appreciably decrease the thickness of the printing plate. If it is desired to maintain the thickness of the printing plate constant, the undercut recesses of the backing may be first filled with a plastic compatible with the composition forming the printing plate, before the latter is pressed against the backing. When this method of application is employed, it will be seen that there will be no change in the thickness of the plastic facing. I have found that printing plates mounted as described withstand the heavy strains imposed by the action of a rotary printing press for the life of the printing surface of the plate.

The facing of my improved printing plate may be readily removed by heating the plate to a temperature above the softening point of the plastic composition forming the plate, and stripping it off. Otherwise, it can not be removed without mutilation of the facing and probable damage to the backing. By heating and removing the facing, the backing may be used over and over.

Features of my invention are illustrated in the accompanying drawing forming a part of this application, in which Fig. 1 is a view illustrating the process of securing the plastic sheet to the metal backing;

Fig. 2 is a sectional view taken along the line II—II of Fig. 1;

Fig. 3 is a fragmentary sectional view drawn to an enlarged scale showing my improved composite printing plate, the plastic facing being mounted on a metal backing etched with reverse undercut dots;

Fig. 4 is a sectional plan view of the portion of the plate shown in Fig. 3, and taken on line IV—IV of Fig. 3;

Fig. 5 is a sectional view similar to Fig. 3, but showing the metal backing etched with high light half tone dots;

Fig. 6 is a sectional plan view of the portion of the plate shown in Fig. 5 taken along line VI—VI of Fig. 5;

Fig. 7 is a sectional view taken on line VII—VII of Fig. 8, showing a further means for securing the plastic facing to the metal backing, especially along the edges of the plate; and Fig. 8 is a plan view of the back of the printing plate, drawn to a reduced scale, and showing the arrangement of the recesses shown in Fig. 7.

Referring to the drawing, I show in Fig. 1 a conventional press 10, which may be of any suitable design, and having an upper platen 11 and a lower platen 12. On the lower platen 12 rests a hollow cradle 13 having its upper surface curved to the required curvature for the printing plate being made. The cradle 13 is provided with pipe connections 16 and 17 for circulating water therethrough to maintain the printing surface of the facing cool while it is being mounted. The plastic facing bearing the printing surface is shown at 18, and the curved metal backing, prepared as already described, at 19. Against the metal backing 19 is pressed a hollow shell 21 having its under surface curved corresponding to the curvature of the metal backing 19 whereby to fit snugly against it. Pipe connections 22 and 23 provide a means for circulating a heating medium, such as steam, through the shell. With the parts arranged as described, pressure is applied to the shell 21 through the upper platen 11 by means of the screw 24. The backing 19, heated by the shell 21, heats the plastic facing 18 and causes it to unite with the backing.

As hereinbefore mentioned, if the backing has already been coated with plastic so as to fill the recesses in the plate, the facing unites with the plastic already in the recesses. If the backing has not been so treated, the plastic composition of the facing enters the recesses and fills them.

Referring to Figs. 3 and 4 of the drawing, the backing may be prepared by subjecting its sensitized surface to light through a photo engraver's screen and etching to provide small, undercut, reverse dot openings 26. It may also be prepared by subjecting the sensitized surface of the backing to light through a photo engraver's high light, half tone screen and etching to provide undercut "dots" 27, as shown in Figs. 5 and 6. The method of etching illustrated in Figs. 3 and 4 is preferred for the reason that less plastic material is employed in uniting the facing to the backing and the thickness of the plate is less likely to be disturbed than with the method shown in Figs. 5 and 6.

I have found that the strain on a curved plate such as herein disclosed, in operation, is shearing as well as compressive. The mixture of cellulose acetate and lead carbonate disclosed in my prior Patent No. 2,219,587 is well able to withstand the compressive strains imposed upon it, while the method of joining such a plastic facing to a metallic backing as herein disclosed provides a means for resisting the shearing strains imposed upon the facing.

I have found that in addition to etching the surface of the metal backing, as shown in Figs. 3 to 6 inclusive, that the facing may be joined to the backing, especially along the edges of the plate, by providing holes 28 extending entirely through the backing 19 and countersunk, as at 29, to provide shoulders on the underside of the backing 19. Before placing the backing 19 in the press 10, as shown in Fig. 1, the holes 28 are filled with a plastic composition compatible with that employed in the plastic facing 18, whereby when the facing is subjected to heat and pressure in the press 10, it fuses with and joins to the composition in the holes 28, thereby firmly uniting therewith. A line of such holes 28 may be provided on each edge of the plate, as shown in Fig. 7.

If the etched surface of the backing 19 is to be treated so as to fill the undercut recesses with plastic before applying the facing, this may be accomplished by dissolving the plastic composition in a volatile solvent and by painting the surface of the backing with the dissolved plastic and allowing the solvent to evaporate. This will completely fill the undercut recesses so that the material therein will unite with the material of the plastic facing upon the application of heat and pressure.

While I contemplate the use of a cellulosic plastic composition, such as is disclosed in my prior Patent No. 2,219,587, it will be obvious that any plastic printing plate moldable under heat and pressure may be secured to a metallic backing in accordance with my invention. Plastics having a softening point below the temperature of steam at atmospheric pressure lend themselves more economically to handling than do others. Also, where a solvent is to be employed to fill the undercut recesses of the backing before applying the facing, a plastic soluble in a volatile solvent, such as actone, alcohol, or other suitable solvent is preferred.

From the foregoing it will be apparent that I have devised an improved composite printing plate embodying a plastic facing bearing the printing surface and a metal backing, and a process of making the same.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. The method of securing a thermoplastic printing plate to a metallic backing which comprises etching the surface of the backing to provide undercut recesses, heating the backing to a temperature above the softening point of the plastic plate, and pressing the relatively cool plastic plate against the heated backing to cause it to engage therewith, and maintaining the outer surface of the plastic sheet cool.

2. The method of securing a thermoplastic printing plate to a metallic backing which comprises etching the surface of the backing to provide undercut recesses, filling the recesses with plastic, heating the backing to a temperature above the softening point of the plastic plate pressing the relatively cool sheet against the heated backing to cause it to engage therewith, maintaining the outer surface of the plastic sheet at a temperature below its softening point, and cooling the backing as soon as it is engaged with the plastic sheet.

3. The method of making a curved printing plate having a plastic facing and a metal backing which comprises forming the backing to the required curvature, etching the same to provide undercut recesses in the convex surface thereof, filling the recesses with a plastic composition compatible with that of the printing plate, heating the backing to a temperature above the softening point of the plastic facing, pressing the back of the printing plate against the etched surface of the backing, and simultaneously cooling the printing face of the plate.

CLARENCE E. BOUTWELL.